(12) United States Patent
Li et al.

(10) Patent No.: US 12,198,273 B2
(45) Date of Patent: Jan. 14, 2025

(54) SYSTEMS AND METHODS FOR MESH GEOMETRY PREDICTION FOR HIGH EFFICIENCY MESH CODING

(71) Applicant: Adeia Guides Inc., San Jose, CA (US)

(72) Inventors: Zhu Li, Overland Park, KS (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/974,863

(22) Filed: Oct. 27, 2022

(65) Prior Publication Data

US 2024/0144596 A1 May 2, 2024

(51) Int. Cl.
*G06T 17/20* (2006.01)
(52) U.S. Cl.
CPC .................... *G06T 17/20* (2013.01)
(58) Field of Classification Search
None
See application file for complete search history.

(56) References Cited

U.S. PATENT DOCUMENTS

| 2021/0118239 A1* | 4/2021 | Santesteban | ........... G06N 3/044 |
| 2022/0051094 A1* | 2/2022 | Chentanez | ............... G06N 3/04 |

OTHER PUBLICATIONS

"Draco 3D Mesh Compression", https://google.github.io/draco/, retrieved on Jan. 5, 2023.
"Minkowski Engine", https://github.com/NVIDIA/MinkowskiEngine, retrieved on Jan. 5, 2023.
"MPEG VPCC", https://github.com/MPEGGroup/mpeg-pcc-tmc2, retrieved on Jan. 5, 2023.
Alface, Patrice Rondao, et al., "Nokia's response to CfP for Dynamic Mesh compression", International Organization for Standardization ISO/IEC JTC 1/SC 29/WG 7 Coding of Moving Pictures and Audio, Apr. 2022, 1-35.
Garland, Michael, et al., "Simplifying surfaces with color and texture using quadric error metrics", IEEE Visualization, 1998, 1-8.

(Continued)

*Primary Examiner* — Frank S Chen
(74) *Attorney, Agent, or Firm* — Haley Guiliano LLP

(57) ABSTRACT

Systems and methods are provided for efficiently encoding geometry information for 3D media content. An illustrative system generates a low-resolution polygon mesh from a high-resolution polygon mesh. The system uses a vertex occupancy prediction network to generate, from vertices of the low-resolution polygon mesh, approximated vertices of the high-resolution polygon mesh. The system uses a connectivity prediction network to generate, from approximated vertices of the high-resolution polygon mesh, approximated connections of the high-resolution polygon mesh. The system computes vertex errors between the approximated vertices and the vertices of the high-resolution polygon mesh, and connectivity errors between the approximated connections and the connections of the high-resolution polygon mesh. The system transmits, to a receiver over a communication network, bitstreams of the low-resolution polygon mesh, the vertex errors, and the connectivity errors for reconstruction of the high-resolution polygon mesh and display of the 3D media content.

20 Claims, 10 Drawing Sheets

(56) References Cited

OTHER PUBLICATIONS

Graziosi, Danillo B., et al., "[V-CG] Sony's Dynamic Mesh Coding Call for Proposal Response", International Organization for Standardization ISO/IEC JTC 1/SC 29/WG 7 Coding of Moving Pictures and Audio, Apr. 2022, 1-30.

Mammou, Khaled, et al., "[V-CG] Apple's Dynamic Mesh Coding CfP Response", International Organization for Standardization ISO/IEC JTC 1/SC 29/WG 7 Coding of Moving Pictures and Audio, Apr. 2022, 1-21.

Marvie, Jean-Eudes, et al., "[V-CG] InterDigital's Response to Dynamic Mesh Coding CfP", International Organization for Standardization ISO/IEC JTC 1/SC 29/WG 7 Coding of Moving Pictures and Audio, Apr. 2022, 1-43.

Zhang, Xiang, et al., "[V-CG] Tencent's Dynamic Mesh Coding CfP Response", International Organization for Standardization ISO/IEC JTC 1/SC 29/WG 7 Coding of Moving Pictures and Audio, Apr. 2022, 1-16.

* cited by examiner

SYSTEMS AND METHODS FOR MESH GEOMETRY PREDICTION FOR HIGH EFFICIENCY MESH CODING

BACKGROUND

This disclosure is directed to systems and methods for coding mesh video frames, and in particular, mesh geometry compression.

SUMMARY

Advancements in computerized video processing technology have enabled expanded use of complex video that takes advantage of captured 3D data. For example, memory dense 3D video data can be obtained using live motion capture (e.g., when an actor wears markers or sensors on a bodysuit). In another example, 3D virtual environments may require memory dense storage of 3D video data for use in Augmented Reality (AR) or Virtual Reality (VR) applications. Storage of such massive information without compressing is taxing on storage systems and is very computationally intensive. Moreover, an attempt to transmit such data via a communication network is extremely bandwidth demanding and may cause network delays and unacceptable latency.

Mesh is a surface-based representation that can be used in representing 3D objects. A mesh may be represented by vertices, the polygons they form, and texture information within each polygon. The polygon may be a triangle, quadrilateral, or other types of polygons. Dynamic mesh compression is a key technology in enabling the metaverse vision of immersive interactions with both natural and synthetic content. However, the compression of mesh representation is challenging as vertices are irregularly sampled in 3D space and the polygons require signaling for mesh-based rendering.

To help address these problems, systems and methods are described herein for efficiently coding and decoding of geometry information for 3D media content (e.g., mesh representation of 3D objects). In some embodiments, a computer system (e.g., using a codec application) generates a low-resolution polygon mesh from a high-resolution polygon mesh, each of the low-resolution polygon mesh and the high-resolution polygon mesh including vertices and connections that represent 3D media content. For example, a polygon mesh may be represented by vertices and their connectivity (e.g., connection of each vertex of the vertices to a number of nearest neighbor vertices).

The system may use a vertex occupancy prediction network to generate, from the vertices of the low-resolution polygon mesh (e.g., from vertices of a low-resolution polygon mesh that is reconstructed from a bitstream of the generated low-resolution polygon mesh), approximated vertices of the high-resolution polygon mesh. In some embodiments, a mesh decoder may decode a low-resolution mesh bitstream to generate a low-resolution mesh based on the information in the low-resolution mesh bitstream. For example, the mesh geometry coding tool DRACO may be used to decode a bitstream and generate a 3D geometric mesh. The generated low-resolution mesh may include vertices and connectivity. In some embodiments, the system may use the vertices of the low-resolution polygon mesh (e.g., from a simplified version of the high-resolution mesh) to approximate vertices of the high-resolution polygon mesh. The vertex occupancy prediction network may be trained according to a first learning algorithm, for example, by adjusting weights until the vertex occupancy prediction network begins predicting output high-resolution vertex information from the low-resolution vertex information with sufficient degree of correctness. The weights adjusted by the first learning algorithm may be weights of the vertex occupancy prediction network (e.g., weights of a neural network) used to predict output high-resolution vertex information from the low-resolution vertex information. Correctness may be based on ground truth high-resolution vertex information. For example, a sufficient degree of correctness may be when the vertex occupancy prediction network outputs a predicted high-resolution vertex information that is close (e.g., within a suitable error, e.g., within 1% accuracy) to the ground truth high-resolution vertex information from an input of ground-truth low-resolution vertex information.

In one aspect, the system may use the vertex occupancy prediction network to generate the approximated vertices, at least in part, by using a 3D sparse convolution engine Minkowski Network to generate initial feature channels. The system may use a first plurality of groups of Multi-Resolution Convolution Blocks (MRCBs) and a Stride-2 downscaling convolution layer to produce, from the initial feature channels, expanded feature channels. The system may use a second plurality of groups of a Stride-2 upscaling convolution layer and the MRCBs to produce, from the expanded feature channels, output feature channels. The system may use the 3D sparse convolution engine Minkowski Network to generate, from the output feature channels, a final output feature. The system may use a binary cross entropy SoftMax layer to output, from the final output feature, the probability of occupancy for vertices of a mesh object. For example, the mesh object may be a mesh object cube. The mesh object may be a 3D structure defining all potential vertices for the high-resolution polygon mesh. For example, the 3D structure may be a table, where each entry in the table represents a potential vertex. For example, if an entry in a table for (x,y,z), e.g., (15, 15, 15) is "1", then there is a vertex. For example, if an entry in a table for (x,y,z), e.g., (15, 15, 15) is "0", then there is no vertex. In some embodiments, the final output feature may be an output feature (e.g., intermediate output feature) that may be processed by one or more additional layers (e.g., any suitable layers of a vertex occupancy prediction network). In some embodiments, the system may generate a final output feature that is the probability of occupancy for vertices of the mesh object. In some embodiments, the system may generate a final output feature that are the approximated vertices of the high-resolution polygon mesh.

The system may compute a probability of occupancy for vertices of a mesh object, compare the probability of occupancy for the vertices of the mesh object to a threshold value, and include, as the approximated vertices of the high-resolution polygon mesh, vertices of the mesh object associated with a corresponding probability of occupancy greater than the threshold value.

The system may use a connectivity prediction network to generate, from approximated vertices of the high-resolution polygon mesh, approximated connections of the high-resolution polygon mesh. In some embodiments, the system uses a connectivity prediction network to generate, from reconstructed vertices of the high-resolution polygon mesh, approximated connections of the high-resolution polygon mesh. The reconstructed vertices of the high-resolution polygon mesh may be a sum of the vertex residual (e.g., vertex error) and the approximated vertices of the high-resolution polygon mesh (e.g., correcting for vertex errors). The connectivity prediction network may be trained according to a second learning algorithm, for example, by adjusting weights of the second learning algorithm until the connectivity prediction network begins predicting output high-resolution connection information from the high-resolution vertex information with sufficient degree of correctness. The weights adjusted by the second learning algorithm may be weights of the connectivity prediction network (e.g., weights of a neural network) used to predict output high-resolution connection information from the high-resolution vertex information. Correctness may be based on ground truth high-resolution connection information. For example, a sufficient degree of correctness may be when the connectivity prediction network outputs a predicted high-resolution connection information that is close (e.g., within a suitable error, e.g., within 1% accuracy) to the ground truth high-resolution connection information from an input of ground-truth high-resolution vertex information.

In one aspect, the system may use the connectivity prediction network to generate the approximated connections, at least in part, by using a 3D sparse convolution engine Minkowski Network to generate initial feature channels. The system may use a first plurality of groups of Multi-Resolution Convolution Blocks (MRCBs) and a Stride-2 downscaling convolution layer to produce, from the initial feature channels, expanded feature channels. The system may use a second plurality of groups of a Stride-2 upscaling convolution layer and the MRCBs to produce, from the expanded feature channels, output feature channels. The system may use the 3D sparse convolution engine Minkowski Network to generate an intermediate output feature from the output feature channels. The system may use a transformer block to generate, from the intermediate output feature, a final output feature. The system may use a binary cross entropy SoftMax layer to output the probability of connectivity for connections of the approximated vertices of the high-resolution polygon mesh. In some embodiments, the final output feature may be an output feature (e.g., another intermediate output feature) that may be processed by one or more additional layers (e.g., any suitable layers of a connectivity prediction network). In some embodiments, the system may generate a final output feature that is the probability of connectivity for connections of the approximated vertices of the high-resolution polygon mesh. In some embodiments, the system may generate a final output feature that are the approximated connections of the high-resolution polygon mesh.

The system may compute a probability of connectivity for connections of the approximated vertices of the high-resolution polygon mesh. The system may compare the probability of connectivity for the connections of the approximated vertices of the high-resolution polygon mesh to a threshold value. The system may include, as the approximated connections of the high-resolution polygon mesh, connections of the approximated vertices of the high-resolution polygon mesh with a corresponding probability of connectivity greater than the threshold value.

The system may compute vertex errors (e.g., vertex residual) between the approximated vertices and the vertices of the high-resolution polygon mesh. The system may compute connectivity errors (e.g., connectivity residual) between the approximated connections and the connections of the high-resolution polygon mesh. The system may transmit, to a receiver over a communication network, bitstreams of the low-resolution polygon mesh, the vertex errors, and the connectivity errors for reconstruction of the high-resolution polygon mesh and display of the 3D media content.

In some embodiments, the system provides a prediction across scale framework for mesh geometry coding. In some embodiments, the system provides a vertices prediction via a sparse convolutional network with multi-scale occupancy learning. In some embodiments, the system provides a connectivity prediction with kNN (k-Nearest Neighbor) transformer model.

As a result of the use of these techniques, 3D media content may be efficiently coded for storage and/or for transmission.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
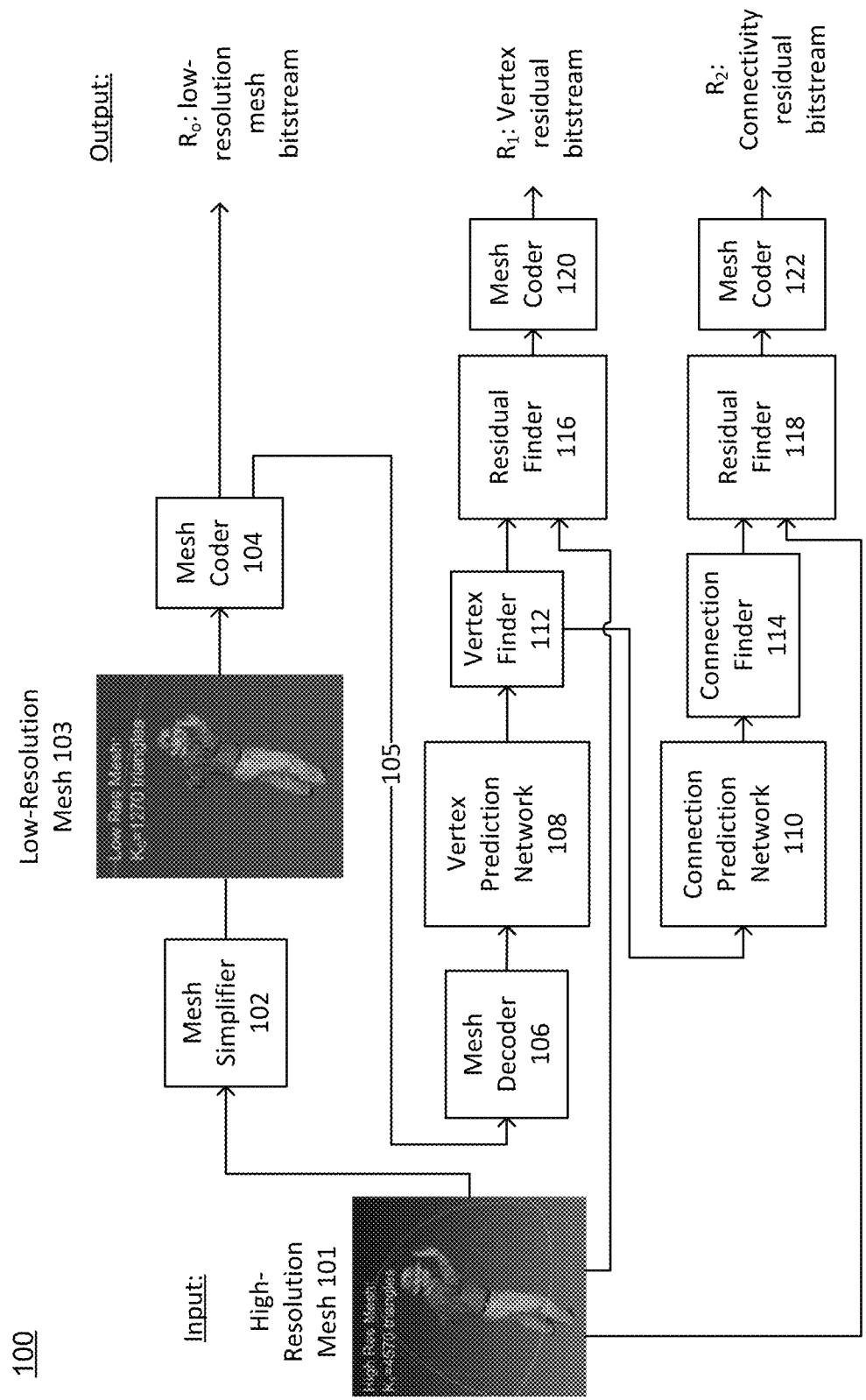
FIG. 1 shows an illustrative example of a deep learning prediction-based mesh geometry coding system, in accordance with some embodiments of this disclosure.

Dynamic mesh compression is a key technology in enabling the metaverse vision of immersive interactions with both natural and synthetic content. Different from Point Cloud (PC) based representation, mesh is a surface polygon based representation that can be more efficient in representing photo-realistic 3D objects. The graphics industry also has good hardware platform support for real time rendering and display of mesh based representation. A mesh may be represented by 3D vertices, polygons formed by the vertices (e.g., triangles, quadrilateral, other polygons), and texture information within each polygon. For example, a triangle mesh may be represented of 3D vertices, the triangles formed by the vertices, and the texture information within each triangle.

Compression of mesh representations is challenging as vertices are irregularly sampled in 3D space, and the polygons need to be signaled for mesh based rendering. To help address these challenges, systems and methods are provided herein for efficiently coding geometry information for 3D media content. A deep learning based vertices upsampling and connectivity prediction scheme, as disclosed herein, can significantly improve the coding efficiency over existing handcrafted state of the art solutions.

Mesh is made of geometry (e.g., vertices and their connectivity) and attributes (e.g., color and/or texture) information. This disclosure relates to mesh geometry compression, which is made of vertices and their connectivity. In Moving Picture Experts Group (MPEG) mesh compression standardization efforts, the Video based Point Cloud Compression (VPCC) framework may be utilized to code the geometry as depth field and attributes as 2D patches. However, a main weakness of the VPCC framework may be a lack of new deep learning based prediction scheme. Disclosed herein is a mesh geometry prediction framework based on vertex occupancy and connectivity prediction from a sparse mesh representation. The compression may generate a bitstream on the residuals from the prediction and hence greatly improve the efficiency. For the vertices, the compression may signal a sparse matrix of N×1 vertex residual, while for connectivity, the compression may signal a sparse matrix of N'×K connectivity residual. Traditional run-length coding may be sufficient for this purpose.

In some embodiments, a deep learning mesh geometry prediction tool may be used for a high efficiency residual coding scheme. An input mesh (e.g., high-resolution mesh) may be simplified to a low-resolution representation with a reduced number of vertices and polygons. A baseline bitstream $R_0$ of the low-resolution representation may be generated using a mesh geometry coding tool. Two deep learning networks may be trained to predict the vertices occupancy and connectivity from the low-resolution mesh decoded from the bitstream. The difference between the predicted and coding target (e.g., high-resolution input mesh) may be quantized and entropy coded to generate bitstreams $R_1$ and $R_2$ representing vertices and connectivity, respectively. The bitstreams $R_0$, $R_1$, and $R_2$ may be transmitted to a receiver over a communication network for reconstruction of the high-resolution polygon mesh and display of the 3D media content.

In some embodiments, the architecture is extended to accommodate an adaptive streaming use case. Multiple quality levels and bitrates may be encoded for a same mesh representation. The streams may be delivered adaptively, depending on bandwidth available to each of the multiple receivers.

In some embodiments, the multiresolution representations is also applicable to progressive mesh reconstruction in the case of static 3D mesh when bandwidth is limited. A bitstream representing the low-resolution mesh may first be delivered for fast decoding and rendering, and a higher quality mesh may be reconstructed when the bitstreams of residual vertices and connectivity get delivered.

FIG. 1 shows an illustrative example of deep learning prediction-based mesh geometry coding system 100, in accordance with some embodiments of this disclosure. The input to the system is a high-resolution mesh 101. The system may access or receive the high-resolution mesh 101 as input. The system outputs a baseline bitstream $R_0$ of a simplified low-resolution representation of the input mesh 101, and bitstreams of the differences representing vertices and connectivity $R_1$ and $R_2$ between a predicted high-resolution mesh and the input mesh 101. The efficiency of the framework lies in the network trained to predict a high resolution and high quality mesh from a low resolution and low quality mesh version. The system includes a mesh simplifier 102, a mesh coder 104, a mesh decoder 106, a vertex prediction network 108, a connection prediction network 110, a vertex finder 112, a connection finder 114, a residual finder 116, a residual finder 118, a mesh coder 120, and a mesh coder 122.

The mesh simplifier 102 generates a low-resolution polygon mesh from a high-resolution polygon mesh (e.g., simplifies a high-resolution mesh to a low-resolution mesh). For example, the input to the mesh simplifier 102 is a high-resolution mesh 101, and the mesh simplifier 102 outputs a low-resolution mesh 103. Mesh simplification is a standard tool in computer graphics that can generate a low-resolution mesh with much fewer polygons (e.g., triangles) than an input or initial high-resolution mesh to indicate information with a low bit rate. For example, a bitstream generated from a low-resolution mesh may be transmitted at a low bit rate (e.g., a lower bit rate than a bitstream generated from an initial high-resolution mesh). An example algorithm that may be applied to simplify a high-resolution mesh to a low-resolution representation is described by Garland, Michael, and Paul S. Heckbert. "Simplifying surfaces with color and texture using quadric error metrics." Proceedings Visualization'98 (Cat. No. 98CB36276). IEEE, 1998, which is herein incorporated by reference in its entirety. In the example shown in FIG. 1, the high-resolution mesh 101 is a triangle mesh represented by 4570 triangles, and the low-resolution mesh 103 is a triangle mesh represented by 1270 triangles, the low-resolution mesh 103 having fewer triangles than the high-resolution mesh 101. In some embodiments, the high-resolution mesh 101 and the low-resolution mesh 103 may represent a polygon mesh of different types and number of polygons, the low-resolution mesh 103 having fewer polygons than the high-resolution mesh 101.

The mesh coder 104 codes a mesh into a bitstream. For example, the input to the mesh coder 104 is a low-resolution mesh 103, and the mesh coder 104 outputs a low-resolution mesh bitstream $R_0$. Mesh coder 104 may code the low-resolution mesh 103 into a bitstream $R_0$ representing the low-resolution mesh. The low-resolution mesh bitstream $R_0$ is provided as an output of the system. For example, mesh coder 104 may utilize a handcrafted mesh geometry coding tool to generate a baseline bitstream $R_0$. An example handcrafted mesh geometry coding tool that may be used to generate a bitstream is DRACO (e.g., as described in Google Github, Draco 3D Data Compression, accessed on Jun. 14, 2022, which is herein incorporated by reference in its entirety).

The mesh decoder 106 decodes a bitstream to generate a mesh based on the information in the bitstream. For example, the mesh geometry coding tool DRACO may be used to decode a bitstream and generate a 3D geometric mesh. The low-resolution mesh bitstream 105 (e.g., low-resolution mesh bitstream $R_0$) may be provided as an input to a mesh decoder 106. The mesh decoder 106 may generate a mesh from the low-resolution mesh bitstream 105. The generated low-resolution mesh may be a version (e.g., reconstruction) of the low-resolution mesh 103. In one embodiment, the reconstructed mesh may include vertices and connectivity. For example, the reconstructed mesh may be represented by $N_O$ vertices and their connectivity.

To recover a high quality mesh representation of the 3D data from a low quality mesh representation, a network may be trained that can learn the properties of mesh geometry from the low-resolution simplified version. In one embodiment, the network includes two parts, a vertex prediction network 108 (e.g., a vertex occupancy prediction network) and a connection prediction network 110 (e.g., connectivity prediction network).

Figure 2:
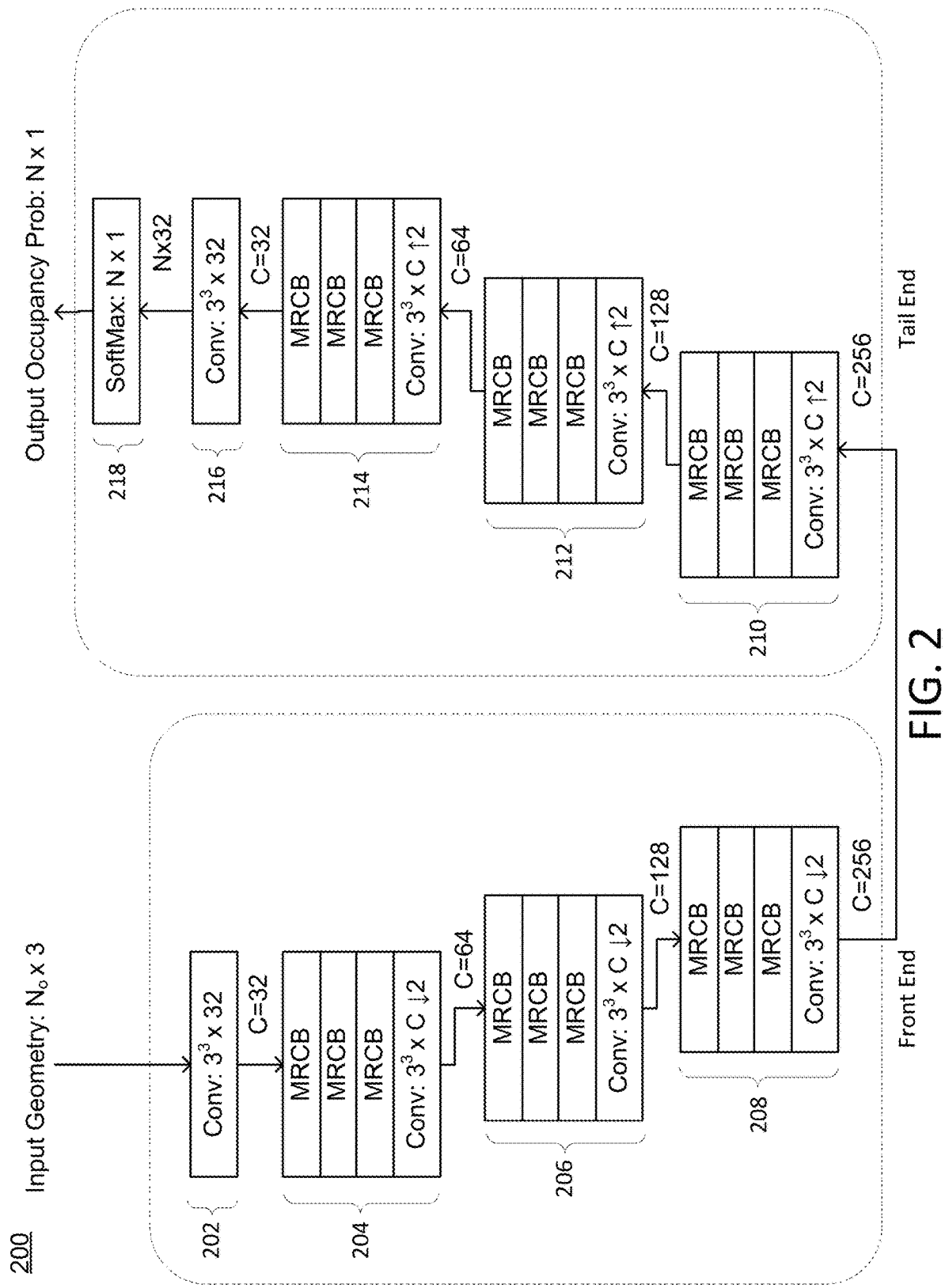
FIG. 2 shows an illustrative example of a vertex occupancy prediction network, in accordance with some embodiments of this disclosure.

The vertex prediction network 108 may be used to generate approximated vertices for a high resolution and high quality mesh from a low resolution and low quality mesh (e.g., vertices of a low resolution and low quality mesh). The vertex prediction network 108 may be trained according to a first learning algorithm (e.g., by adjusting weights until the vertex prediction network begins predicting output high-resolution vertex information from the low-resolution vertex information with sufficient degree of correctness). In one embodiment, the vertex prediction network 108 (e.g., vertex occupancy prediction network) predicts a probability of occupancy of vertices in a mesh object (e.g., mesh object cube). The mesh object may be a 3D structure defining all potential vertices for the high-resolution polygon mesh. For example, the 3D structure may be a table, where each entry in the table represents a potential vertex. For example, if an entry in a table for (x,y,z), e.g., (15, 15, 15) is "1", then there is a vertex. For example, if an entry in a table for (x,y,z), e.g., (15, 15, 15) is "0", then there is no vertex. The vertex prediction may be achieved via a multi-resolution 3D space occupancy learning network that is illustrated in FIG. 2. The input to the vertex prediction network 108 may be the vertices of a reconstructed version of the low-resolution mesh 103 (e.g., an output from mesh decoder 106). The output of the vertex prediction network may be an occupancy probability for the vertices in a mesh object cube (e.g., a larger number of vertices). For example, the input to the vertex prediction network 108 may be a list of $N_O$ vertices (e.g., $N_O$=1000, or some other number of vertices), each vertex represented by coordinates (x,y,z) (e.g., a matrix of size $N_O \times 3$). The output of the vertex prediction network 108 may be an occupancy probability computed for each vertex of a mesh object cube having a much larger number of N vertices (e.g., a matrix of size $N \times 1$). As an example, the mesh object cube may be of size 10-bit, corresponding to $N=(2^{10})^3$, or 1,073,741,824 vertices. The vertex prediction network 108 may predict a probability of occupancy of each vertex in the mesh object cube. The occupancy probability can be used to identify which vertices in the mesh object cube is included to represent a version of the high-resolution mesh 101. In this way, the vertex prediction network 108 can be used to generate, from the low-resolution polygon mesh vertices (e.g., a reconstructed version of the low-resolution mesh 103), approximated vertices of the high-resolution polygon mesh. In some embodiments, the system may use the vertices of the low-resolution polygon mesh 103 (e.g., from a simplified version of the high-resolution mesh) to approximate vertices of the high-resolution polygon mesh.

The vertex finder 112 determines the vertices that are included in the approximated vertices of a mesh. For example, the input of the vertex finder 112 may be the probability of occupancy of vertices in a mesh object cube (e.g., vertex occupancy probability matrix of $N \times 1$), and the output may be the approximated vertices. The output of the vertex finder 112 may indicate whether or not the vertex in the mesh object cube is included in the approximated vertices of the high-resolution mesh 101 (e.g., vertex occupancy matrix of $N \times 1$, with an entry "1" indicating the vertex is included, and an entry "0" indicating the vertex is not included). For example, the vertex finder 112 compares the probability of occupancy of vertices to a threshold value (e.g., to indicate occupancy of a vertex). If a probability of occupancy is greater than the threshold value, the vertex finder 112 includes the corresponding vertex in the approximated vertices of the high-resolution mesh 101 (e.g., entry of the corresponding vertex is "1"). If the probability of occupancy is less than or equal to the threshold value, the vertex finder 112 does not include the corresponding vertex in the approximated vertices of the high-resolution mesh 101 (e.g., entry of the corresponding vertex is "0"). In some embodiments, the corresponding vertex may be included if the probability of occupancy of vertices is greater or equal to a threshold value and excluded if the probability of occupancy is less than the threshold value. The vertex finder 112 may output a vertex occupancy matrix of $N \times 1$. The vertex occupancy matrix of $N \times 1$ may be represented by a list of N' vertices, with each vertex in the list represented by coordinates (x,y,z) (e.g., a matrix of size $N' \times 3$). Each vertex in the list of N' vertices may represent a corresponding occupied vertex in the mesh object cube (e.g., entry of the corresponding vertex is "1" in the vertex occupancy matrix of $N \times 1$).

The connection prediction network 110 may be used to generate approximated connections for a high resolution and high quality mesh from vertices of a high resolution and high quality mesh. The connection prediction network 110 may be trained according to a second learning algorithm (e.g., by adjusting weights until the connection prediction network begins predicting output high-resolution connection information from the high-resolution vertex information with sufficient degree of correctness). In one embodiment, the connection prediction network 110 (e.g., connectivity prediction network) is based on a similar network as the vertex prediction network 108 (e.g., same front end architecture, but different tail end architecture with different loss function) and predicts a probability of connectivity of each occupied vertex in a mesh object cube (e.g., approximated vertices of high-resolution mesh 101) to its nearest neighbor vertices.

The input of the connection prediction network 110 may be the approximated vertices of the high-resolution mesh 101. For simplicity, FIG. 1 shows the output of vertex finder 112 as the input to the connection prediction network 110 to represent the approximated vertices of the high-resolution mesh 101. However, note that for FIG. 1 (and other figures throughout this disclosure), the representation of vertices of a mesh may be as a vertex occupancy matrix or as a list of vertices and in some embodiments the system may handle either representation as appropriate (e.g., internally within components of the system, including a block to change the representation, etc.). For example, the output of vertex finder 112 may be a vertex occupancy matrix of $N \times 1$, the input to the connection prediction network 110 may be a list of vertices of matrix $N' \times 3$, and the system may handle the representation by including a block between the vertex finder 112 and the connection prediction network 110 to change the representation from the vertex occupancy matrix to a list of vertices. In some embodiments, the input to the connection prediction network 110 may be reconstructed vertices of the high-resolution polygon mesh (e.g., high-resolution mesh 101). The reconstructed vertices of the high-resolution polygon mesh may be a sum of a vertex residual (e.g., vertex error) and the approximated vertices of the high-resolution polygon mesh (e.g., correcting for vertex errors).

Figure 4:
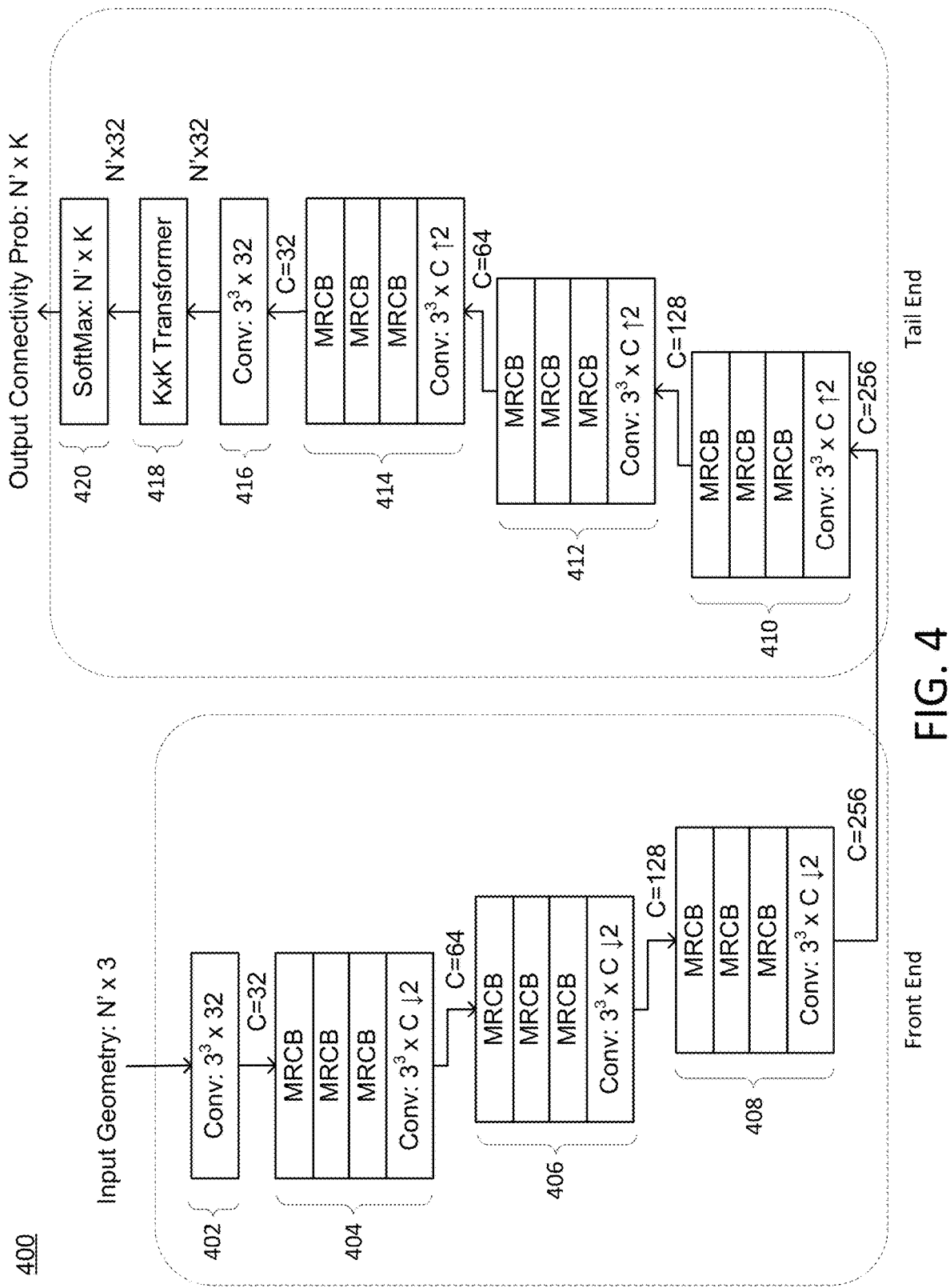
FIG. 4 shows an illustrative example of a connectivity prediction network, in accordance with some embodiments of this disclosure.

The output of the connection prediction network 110 may be a probability of connectivity of K nearest neighbor vertices as candidates for each occupied vertex of the mesh object cube (e.g., a matrix of size N'×K, N' being the number of occupied vertices of the N vertices of the mesh object cube). K may be in a range of 8 to 12 for practical reasons, or K may be a different number based on factors such as saving memory (e.g., limiting the number of nearest neighbor vertices to save memory). The connectivity prediction may be achieved via a multi-resolution 3D space connectivity learning network that is illustrated in FIG. 4. The connection prediction network 110 may predict a probability of connectivity of each occupied vertex in the mesh object cube to its K nearest neighbor vertices. The probability of connectivity can be used to identify which of the K nearest neighbor vertices are connected to an occupied vertex of the mesh object cube, to include as approximated connections of the high-resolution mesh 101. In this way, the connection prediction network 110 can be used to generate, from the approximated vertices of the high-resolution polygon mesh, approximated connections of the high-resolution polygon mesh (e.g., high resolution mesh 101).

The connection finder 114 determines the connections that are included in the approximated connections of a mesh. In one embodiment, the input of the connection finder 114 is the probability of connectivity (e.g., connectivity probability matrix of size N'×K, of each occupied vertex of the object cube to its K nearest neighbors) and the output may be the approximated connectivity (e.g., connections) of the high-resolution mesh 101. The output of the connection finder 114 may indicate whether or not an occupied vertex in the mesh object cube is connected to one of its K nearest neighbor vertices as an approximated connection (e.g., connectivity matrix of size N'×K, N' being the number of occupied vertices of the N vertices of the mesh object cube to its K nearest neighbors, with an entry "1" indicating a connection, and an entry "0" indicating no connection). For example, the connection finder 114 compares the probability of connectivity (of each occupied vertex of the mesh object cube to its K nearest neighbors) to a threshold value (e.g., to indicate whether the nearest neighbor vertex is a connection). If the probability of connectivity is greater than the threshold value, the connection finder 114 includes the connection in the approximated connections of the high-resolution mesh 101 (e.g., entry of the corresponding vertex candidate is set to "1"). If the probability of connectivity is less than or equal to the threshold value, the connection finder 114 does not include the connection in the approximated connections of the high-resolution mesh 101 (e.g., entry of the corresponding vertex candidate is set to "0"). In some embodiments, the corresponding connection may be included if the probability of connectivity of connections is greater or equal to a threshold value, and excluded if the probability of occupancy is less than the threshold value.

The residual finder 116 computes a difference between the approximated vertices of the target high-resolution mesh and the vertices of the target high-resolution mesh. For example, the input of the residual finder 116 is the approximated vertices from the vertex finder 112 and the vertices of the target high-resolution mesh (e.g., high-resolution mesh 101). The output of the residual finder 116 is the vertex residual (e.g., vertex error), or the difference between the approximated vertices and the vertices from the target high-resolution mesh. For example, the vertices of the high-resolution mesh 101 may be a list of vertices with (x,y,z) coordinates, which may be represented as an occupancy matrix of a mesh object cube (e.g., size N×1). The approximated vertices may be represented by an occupancy matrix of the mesh object cube (e.g., size N×1) determined by the vertex finder 112. The residual finder 116 may subtract the occupancy matrix representing the approximated vertices of the high-resolution mesh from the occupancy matrix representing the vertices of the target high-resolution mesh (e.g., high-resolution mesh 101), resulting in the vertex residual.

The residual finder 118 computes a difference between approximated connections of the target high-resolution mesh and the connections of the target high-resolution mesh. The input of the residual finder 118 is the approximated connections from the connection finder 114 and the connections from the target high-resolution mesh (e.g., high-resolution mesh 101). The output of the residual finder 118 is the connectivity residual (e.g., connectivity error), or the difference between the approximated connections and the connections from the target high-resolution mesh. For example, the connections of the high-resolution mesh 101 may be a set of vertices for each vertex that indicates a connection, which may be represented as a connectivity matrix representing connections of N' occupied vertices of the mesh object cube to its K nearest neighbors (e.g., size N'×K, entry of "1" indicating a connection and "0" indicating no connection). The approximated connections of the high-resolution mesh may be represented by a connectivity matrix representing connections of N' occupied vertices of the mesh object cube to its K nearest neighbors determined by the connection finder 114. The residual finder 118 may subtract the connectivity matrix representing the approximated vertices of the high-resolution mesh from the connectivity matrix representing the vertices of the target high-resolution mesh (e.g., high-resolution mesh 101), resulting in the connectivity residual.

The mesh coder 120 encodes the vertex residual into a bitstream. The input of mesh coder 120 is the vertex residual from the residual finder 116. The output of mesh coder 120 is the vertex residual bitstream $R_1$. For example, the mesh coder 120 may utilize a handcrafted mesh geometry coding tool such as DRACO to generate a residual bitstream $R_1$ from the vertex residual.

The mesh coder 122 computes the connectivity residual into a bitstream. The input of mesh coder 122 is the connectivity residual from the residual finder 118. The output of mesh coder 122 is the connectivity residual bitstream $R_2$. For example, the mesh coder 122 may utilize a handcrafted mesh geometry coding tool such as DRACO to generate a residual bitstream $R_2$ from the connectivity residual.

FIG. 2 shows an illustrative example of a vertex occupancy prediction network 200, in accordance with some embodiments of this disclosure. The vertex occupancy prediction network 200 as shown in FIG. 2 is a multi-resolution 3D space occupancy learning network. As an example, a system may train a vertex occupancy prediction network based on mesh geometry information (e.g., vertices and connectivity), such that the vertex occupancy prediction network is configured to receive a low-resolution mesh vertex information as input and output a high-resolution mesh vertex information. The vertex occupancy prediction network may be trained by adjusting weights until the vertex occupancy prediction network begins predicting output high-resolution vertex information from the low-resolution vertex information with sufficient degree of correctness.

The vertex occupancy prediction network 200 has a front end and a tail end. The front end of the vertex occupancy prediction network has as an input a low-resolution mesh vertex matrix of size $N_0 \times 3$. For example, a target high-resolution mesh is simplified to a low-resolution mesh with a reduced number of $N_0$ vertices represented by 3D coordinates (x, y, z). The front end of the vertex occupancy prediction network 200 downscales the input by reducing the spatial resolution (e.g., scaled down by a factor of 2, convolution by skipping next sampling point) and expands the feature channels. The tail end of the vertex occupancy prediction network 200 has as an input the downscaled input with reduced spatial resolution and expanded feature channels. The tail end upscales the downscaled input with reduced spatial resolution by increasing the spatial resolution and shrinking the feature channels. The tail end outputs a vertex occupancy probability matrix of size $N \times 1$.

The input to the network is vertices of the low-resolution mesh of size (e.g., input geometry) $N_0 \times 3$, where $N_0$ is a fraction (e.g., a small fraction) of vertices of the target high-resolution mesh. The input is processed by layer 202 (e.g., "Conv: $3^3 \times 32$" block) to generate an initial feature of 32 channels. The "Conv: $3^3 \times 32$" label of layer 202 may indicate a convolution by 3×3×3 (e.g., $3^3$) filter size for 32 channels. A 3D sparse convolution engine Minkowski Network (e.g., as described in Github, NVIDIA, Minkowski Engine, accessed on Jun. 14, 2022, which is herein incorporated by reference in its entirety) may be used to generate initial feature channels. For example, the input is convolved with a 3D sparse conv engine Minkowski Network (e.g., a standard tool in PYTHON 3D package) to generate an initial feature of 32 dimensions (e.g., 32 feature channels).

The initial feature of 32 dimensions is then further processed with a multi-resolution network by groups of Multi-Resolution Conv Blocks (MRCBs) and a stride-2 downscaling cony layer (e.g., "Conv: $3^3 \times C \downarrow 2$" block) to produce an expansion of feature channels (and decrease the spatial resolution). Groups of MRCBs and a stride-2 downscaling conv layer may be used to produce expanded feature channels from initial feature channels. For example, first, second, and third expansion groups 204, 206, and 208, each made of three MRCBs and a stride-2 downscaling conv layer (e.g., "Conv: $3^3 \times C \downarrow 2$" block), further processes the initial feature of 32 channels with a corresponding expansion of feature channels to 64, 128 until a bottleneck layer of 256.

When the expansion of initial feature channels becomes 256 (e.g., C=256), the expanded feature of 256 channels is then further processed by the multi-resolution network by groups of a stride-2 upscaling conv layer (e.g., "Conv: $3^3 \times C \uparrow 2$" block) and MRCBs to produce output feature channels. Groups of a stride-2 upscaling conv layer (e.g., "Conv: $3^3 \times C \uparrow 2$" block) and MRCBs may be used to produce output feature channels from the expanded feature channels (and to increase the spatial resolution). For example, first, second, and third contraction groups 210, 212, and 214 each made of a stride-2 upscaling conv layer (e.g., "Conv: $3^3 \times C \uparrow 2$" block) and three MRCBs, further processes the expanded feature of 256 channels with a corresponding contraction of feature channels to 128, 64, and 32.

The output feature of 32 channels is further processed by layer 216 (e.g., "Conv: $3^3 \times 32$" block) to generate a final output feature. The 3D sparse convolution engine Minkowski Network may be used to generate a final output feature from the output feature. For example, the output feature of 32 channels may be convolved with a 3D sparse conv engine Minkowski Network to generate a final output feature of N×32.

The final output feature of N×32 may be input to a binary cross entropy SoftMax layer (e.g., "SoftMax: N×1" block 218) that outputs the probability of occupancy of mesh vertices (e.g., size N×1). The binary cross entropy SoftMax layer may be used to output the probability of occupancy for the vertices of the mesh object from the final output feature. For example, the final output of N×32 is further processed by "SoftMax: N×1" block 218 to generate the occupancy probability of vertices in the mesh object (e.g., output geometry of size N×1 (e.g., $N=(2^{10})^3$). In some embodiments, the final output feature may be an output feature (e.g., intermediate output feature) that may be processed by one or more additional layers (e.g., any suitable layers of a vertex occupancy prediction network). In some embodiments, the system may generate a final output feature that is the probability of occupancy for vertices of the mesh object. In some embodiments, the system may generate a final output feature that are the approximated vertices of the high-resolution polygon mesh.

In some embodiments, any suitable number of MRCBs (e.g., a different number than three) may be used in the expansion groups and the contraction groups. For example, instead of three MRCBs, there may be five MRCBs used in the expansion and the contraction groups. In some embodiments, any suitable number of expansion groups and contraction groups (e.g., a different number than three) may be used. For example, instead of three expansion groups and three contraction groups, there may be five expansion groups and five contraction groups. In some embodiments, any of the layers of the network may be any appropriate filter size and channel (e.g., instead of "Conv: $3^3 \times 32$" label of layer 202 which may indicate a convolution by 3×3×3 (e.g., $3^3$) filter size for 32 channels, a different suitable filter size or number of channels may be used). For example, instead of 32 channels, it could be 64, 128, or any other appropriate number. While FIG. 2 shows a particular network, any suitable network that predicts the occupancy probability of vertices can be used.

Figure 3:
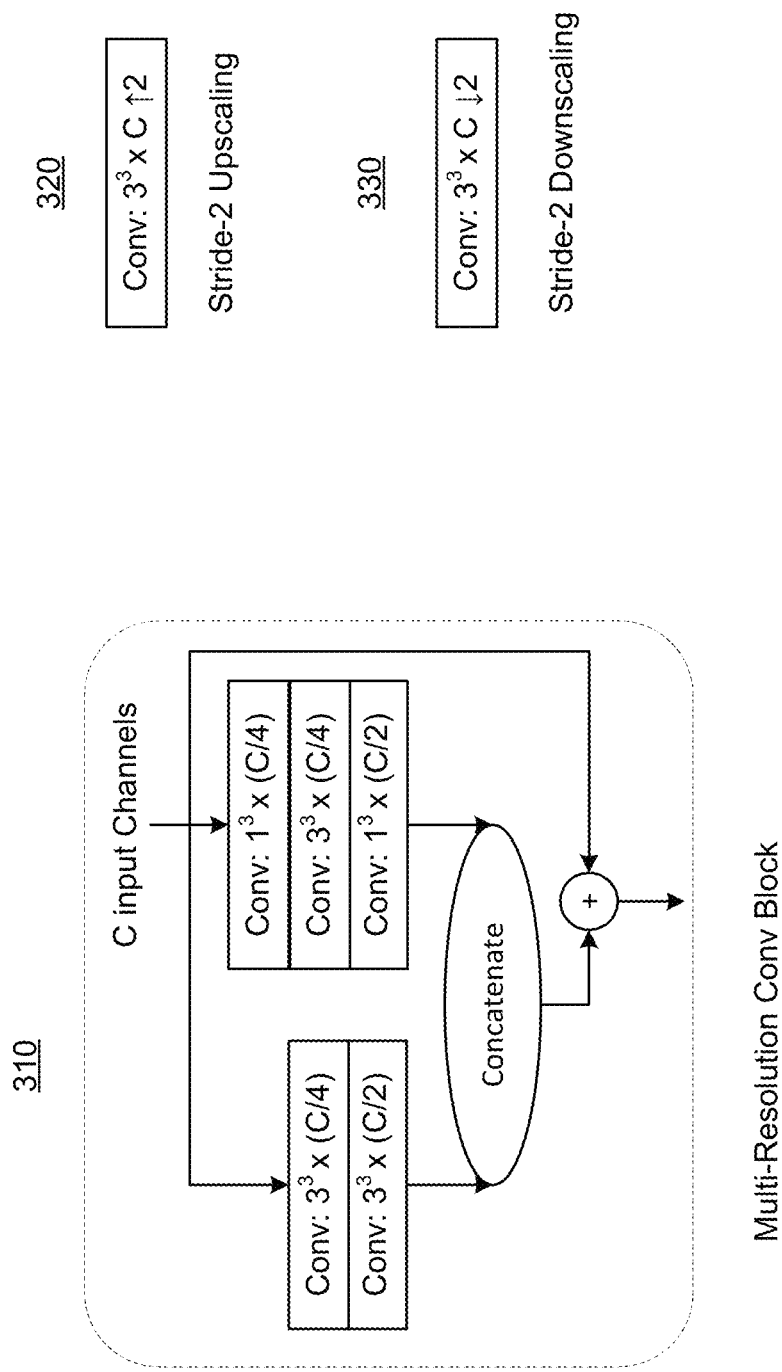
FIG. 3 shows an illustrative example of a multi-resolution convolution block, stride-2 upscaling block, and stride-2 downscaling block, in accordance with some embodiments of this disclosure.

FIG. 3 shows an illustrative example of a multi-resolution convolution block, stride-2 upscaling block, and stride-2 downscaling block in accordance with some embodiments of this disclosure. The MRCB details are illustrated in the example MRCB 310 in FIG. 3. The MRCB 310 takes an input of C input channels. The C input channels drive a "Conv: $3^3 \times (C/4)$" layer and a "Conv: $3^3 \times (C/2)$" layer that outputs a first sub-output. The "Conv: $3^3 \times (C/4)$" layer indicates a convolution by a 3×3×3 filter size for C/4 channels, and the "Conv: $3^3 \times (C/2)$" layer indicates a convolution by a 3×3×3 filter size for C/2 channels. As an example, if the input (e.g., C input channels) to the MRCB is C=128, then the "Conv: $3^3 \times (C/4)$" layer is a "Conv: $3^3 \times 32$" layer and the "Conv: $3^3 \times (C/2)$" layer is a "Conv: $3^3 \times 64$" layer. The C input channels also drives a "Conv: $1^3 \times (C/4)$" layer, a "Conv: $3^3 \times (C/4)$" layer, and a "Conv: $1^3 \times (C/2)$" layer that outputs a second sub-output. The "Conv: $1^3 \times (C/4)$" layer indicates a convolution by a 1×1×1 filter size for C/4 channels, the "Conv: $3^3 \times (C/4)$" layer indicates a convolution by a 3×3×3 filter size for C/4 channels, and the "Conv: $1^3 \times (C/2)$" layer indicates a convolution by a 1×1×1 filter size for C/2 channels. Continuing with the previous example, if the input is C=128, then "Conv: $1^3 \times (C/4)$" layer is a "Conv: $3^3 \times 32$" layer, "Conv: $3^3 \times (C/4)$" layer is a "Conv: $3^3 \times 32$" layer, and the "Conv: $1^3 \times (C/2)$" layer is a "Conv: $1^3 \times 64$" layer. The first sub-output (e.g., C/2 output feature channels) is concatenated with the second sub-output (e.g., C/2 output feature channels). The concatenated sub-outputs may result in C output feature channels. Continuing with the previous example, if the input is C=128, the first sub-output (e.g., 64 output feature channels) is concatenated with the second sub-output (e.g., 64 output feature channels) to form a concatenated output (e.g., 128 output feature channels). The concatenated first sub-output and second sub-output is added to the C input channels. The output of the MRCB is the sum of the concatenated sub-outputs and the C input channels (e.g., if input is C=128, the output of the MRCB is of 128 channels).

An example stride-2 upscaling block 320, and example stride-2 downscaling block 330 are also shown in FIG. 3. For the first part of the process (e.g., blocks 204, 206, and 208 of FIG. 2), the MRCB output is convolved with a stride-2 downscaling conv layer, while for the second part of the process (e.g., blocks 210, 212, and 214 of FIG. 2), the input to the MRCB is pre-convolved with a stride-2 upscaling layer. In some embodiments, a stride-N downscaling/upscaling block may be used, where N is an integer greater than 1. For example, instead of a stride-2 downscaling block and a stride-2 upscaling block where N=2, a different N, such as N being an integer greater than 2 may be used in accordance with some embodiments of this disclosure. In some embodiments, any appropriate filter size may be used in a stride-N downscaling/upscaling block (e.g., instead of a 3×3×3 or $3^3$ filter size a different filter size may be used).

FIG. 4 shows an illustrative example of a connectivity prediction network 400, in accordance with some embodiments of this disclosure. For the connectivity, the same basic multi-resolution network architecture for vertices prediction is utilized. For example, layer 402, first, second, and third expansion groups 404, 406, and 408, first, second, and third contraction groups 410, 412, and 414, and layer 416 of FIG. 4 may correspond to (e.g., are the same/similar structure as) layer 202, first, second, and third expansion groups 204, 206, and 208, first, second, and third contraction groups 210, 212, and 214, and layer 216 of FIG. 2, respectively. However, a transformer block is added for the final features before the connectivity prediction SoftMax output. For example, a "K×K transformer" layer 418 is added before "SoftMax:N'× K" block 420. The "K×K transformer" layer 418 may be based on a PCT Point Cloud Transformer (e.g., as described in M.-H. Guo et. al. "PCT: Point Cloud Transformer," arXiv:2012.09688v4 [cs.CV] 7 Jun. 2021, which is herein incorporated by reference in its entirety) and may be implemented using a line of function code (e.g., as described in: Github, Strawberry-Eat-Mango, PCT Pytorch, PCT: Point Cloud Transformer, accessed on Aug. 16, 2022, which is herein incorporated by reference in its entirety). The "SoftMax:N'×K" block 420 may be similar to the "SoftMax: N×1" block 218 except the output is an N'×K matrix.

In some embodiments, the input to the connectivity prediction network 400 may be approximated vertices of the high-resolution mesh. For example, the input geometry of connectivity prediction network 400 may be a matrix of N'×3 (e.g., list of N' approximated vertices, each with (x,y,z) coordinates). In some embodiments, any suitable number of MRCBs (e.g., a different number than three) may be used in the expansion groups and the contraction groups. For example, instead of three MRCBs, there may be five MRCBs used in the expansion and the contraction groups. In some embodiments, any suitable number of expansion groups and contraction groups (e.g., a different number than three) may be used. For example, instead of three expansion groups and three contraction groups, there may be five expansion groups and five contraction groups. In some embodiments, a stride-N downscaling/upscaling block may be used, where N is an integer greater than 1. For example, instead of a stride-2 downscaling block and a stride-2 upscaling block where N=2, a different N, such as N being an integer greater than 2 may be used in accordance with some embodiments of this disclosure. In some embodiments, any appropriate filter size may be used in a stride-N downscaling/upscaling block (e.g., instead of a 3×3×3 or $3^3$ filter size a different filter size may be used). In some embodiments, any of the layers of the network may use any appropriate filter size and channel (e.g., instead of "Conv: $3^3$×32" which may indicate a convolution by 3×3×3 (e.g., $3^3$) filter size for 32 channels, a different filter size or number of channels may be used). For example, instead of 32 channels, it could be 64, 128, or any other appropriate number. While FIG. 4 shows a particular network, any suitable network that predicts the connectivity probability of connections can be used.

In one embodiment, the system may use the 3D sparse convolution engine Minkowski Network to generate an intermediate output feature from the output feature channels. For example, the output feature of 32 channels (output from layer 416) may be convolved with a 3D sparse conv engine Minkowski Network to generate intermediate output feature of N'×32. The system may use a transformer block to generate, from the intermediate output feature, a final output feature. For example, the intermediate output features of N'×32 may be input to a "K×K Transformer" layer 418 to final output feature with same dimensionality of N'×32. The system may use a binary cross entropy SoftMax layer to output the probability of connectivity for connections of the mesh object. For example, the final output feature of N'×32 may be input to a binary cross entropy SoftMax layer (e.g., "SoftMax:N'×K" block 420) that outputs the connectivity probability for occupied mesh vertices (e.g., size N'×K). The binary cross entropy SoftMax layer may be used to output the connectivity probability of occupied vertices of the mesh object to other occupied vertices. For example, the final output feature of N'×32 is further processed by "SoftMax: N'×K" block 420 to generate the connectivity probability of each N' vertices to its K nearest neighbors (e.g., N' occupied vertices of the N vertices of the mesh object). In some embodiments, the final output feature may be an output feature (e.g., another intermediate output feature) that may be processed by one or more additional layers (e.g., any suitable layers of a connectivity prediction network). In some embodiments, the system may generate a final output feature that is the probability of connectivity for connections of the approximated vertices of the high-resolution polygon mesh. In some embodiments, the system may generate a final output feature that are the approximated connections of the high-resolution polygon mesh As an example, a system may train a connectivity prediction network based on mesh geometry information (e.g., high resolution mesh vertices and connectivity as ground truth, and high-resolution mesh vertices as input), such that the connectivity prediction network is configured to receive a high-resolution mesh vertices information as input and output a high-resolution mesh connectivity information. The connectivity prediction network may be trained by adjusting weights until the connectivity prediction network begins predicting output high-resolution connectivity information from the high-resolution vertex information with sufficient degree of correctness. While the same basic multi-resolution network architecture for vertices prediction is utilized for the connectivity prediction network, the networks may be trained using different algorithms that may result in different weights for each network.

In some embodiments, the bitstreams $R_1$ and $R_2$ are basically used to signal the vertices occupancy residual and connectivity residual learned from these two networks, and hence achieve high efficiency in coding.

In some embodiments, in the case of encoding multiple bitrates for adaptive streaming, the selection of base, or low-resolution mesh can be dynamic. This would suggest a different mesh simplification for each target bitrate. In this case, the groups of MRCBs may also vary (based on the rate distortion optimization decision), depending on the choice of the low-resolution mesh. The bitstream may include the signaling of such choices so that the decoder selects the appropriate network to reconstruct the mesh. This signaling is applicable to the selection of MRCB groups for the prediction of both vertices and connectivity.

Figure 5:
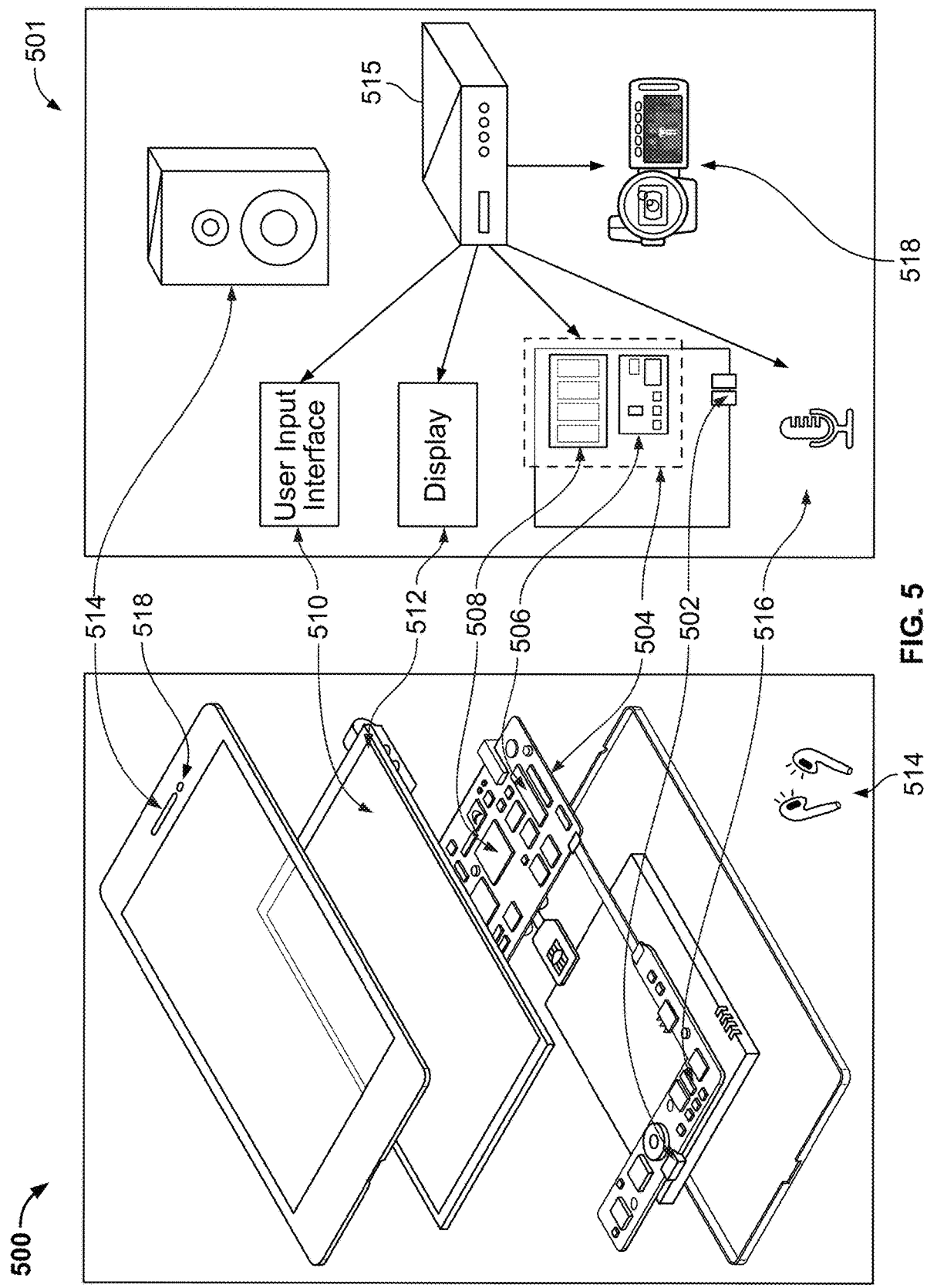
FIG. 5 shows an illustrative user equipment device, in accordance with some embodiments of this disclosure.
Figure 6:
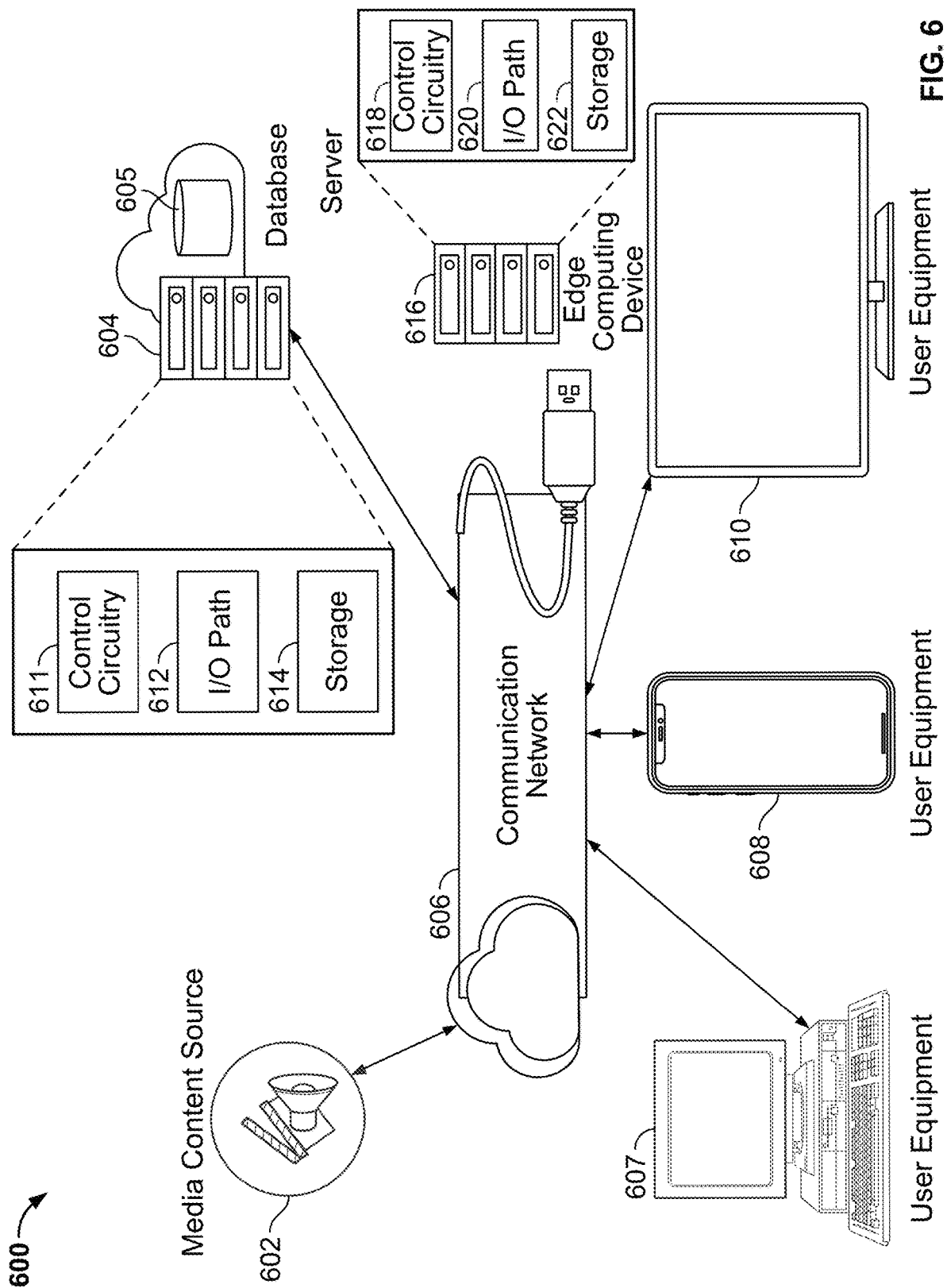
FIG. 6 shows an example system, in accordance with some embodiments of this disclosure.

FIGS. 5-6 depict illustrative devices, systems, servers, and related hardware for image coding/decoding. FIG. 5 shows generalized embodiments of illustrative user equipment devices 500 and 501. For example, user equipment device 500 may be a smartphone device, a tablet, a virtual reality or augmented reality device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display or a computer display. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/output (I/O) path (e.g., circuitry) 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 5 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 500), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the codec application stored in memory (e.g., storage 508). Specifically, control circuitry 504 may be instructed by the codec application to perform the functions discussed above and below. In some implementations, processing or actions performed by control circuitry 504 may be based on instructions received from the codec application.

In client/server-based embodiments, control circuitry 504 may include communications circuitry suitable for communicating with a server or other networks or servers. The codec application may be a stand-alone application implemented on a device or a server. The codec application may be implemented as software or a set of executable instructions. The instructions for performing any of the embodiments discussed herein of the codec application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the codec application may be a client/server application where only the client application resides on device 500, and a server application resides on an external server (e.g., server 604 and/or server 616). For example, the codec application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 604 and/or edge computing device 616), referred to as "the cloud." Device 500 may be a cloud client that relies on the cloud computing capabilities from server 604 to determine whether processing (e.g., at least a portion of virtual background processing and/or at least a portion of other processing tasks) should be offloaded from the mobile device, and facilitate such offloading. When executed by control circuitry of server 604 or 616, the codec application may instruct control circuitry 611 or 618 to perform processing tasks for the client device and facilitate the encoding/decoding.

Control circuitry 504 may include communications circuitry suitable for communicating with a server, edge computing systems and devices, a table or database server, or other networks or servers. The instructions for carrying out the above mentioned functionality may be stored on a server (which is described in more detail in connection with FIG.

6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as codec application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The codec application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide encoding/decoding functionality and perform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the codec application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the codec application may be downloaded and interpreted or otherwise run by an interpreter or virtual machine (run by control circuitry 504). In some embodiments, the codec application may be encoded in the ETV Binary Interchange Format (EBIF), received by control circuitry 504 as part of a suitable feed, and interpreted by a user agent running on control circuitry 504. For example, the codec application may be an EBIF application. In some embodiments, the codec application may be defined by a series of JAVA-based files that are received and run by a local virtual machine or other suitable middleware executed by control circuitry 504. In some of such embodiments (e.g., those employing MPEG-2 or other digital media encoding schemes), codec application may be, for example, encoded and transmitted in an MPEG-2 object carousel with the MPEG audio and video packets of a program.

FIG. 6 is a diagram of an illustrative system 600 for encoding/decoding, in accordance with some embodiments of this disclosure. User equipment devices 607, 608, 610 (e.g., which may correspond to one or more of computing device 212 may be coupled to communication network 606). Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more servers 604, and one or more edge computing devices 616 (e.g., included as part of an edge computing system). In some embodiments, the codec application may be executed at one or more of control circuitry 611 of server 604 (and/or control circuitry of user equipment devices 607, 608, 610 and/or control circuitry 618 of edge computing device 616). In some embodiments, data may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide encoding/decoding data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620 and storage 622, which may be implemented in a similar manner as control circuitry 611, I/O path 612 and storage 624, respectively of server 604. Edge computing device 616 may be configured to be in communication with one or more of user equipment devices 607, 608, 610 and server 604 over communication network 606, and may be configured to perform processing tasks (e.g., encoding/decoding) in connection with ongoing processing of video data. In some embodiments, a plurality of edge computing devices 616 may be strategically located at various geographic locations, and may be mobile edge computing devices configured to provide processing support for mobile devices at various geographical regions.

Figure 7:
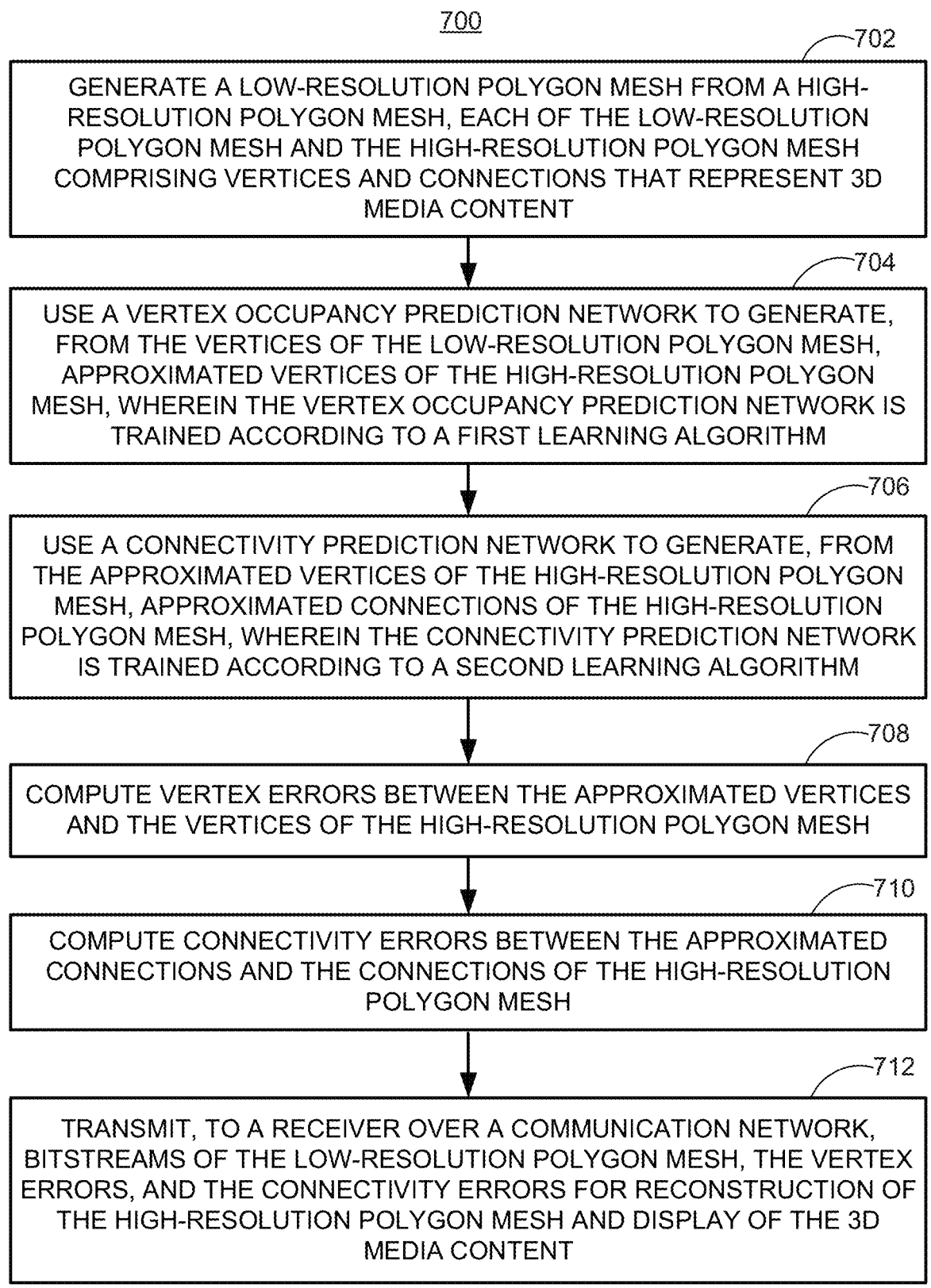
FIG. 7 is a flowchart of a detailed illustrative process for coding 3D media content data, in accordance with some embodiments of this disclosure.

FIG. 7 is a flowchart of a detailed illustrative process for generating approximated vertices of a high-resolution polygon mesh from low-resolution polygon mesh, in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead.

At step 702, control circuitry (e.g., control circuitry 611, control circuitry 618, or control circuitry of any of devices 607, 608, or 610) generates a low-resolution polygon mesh from a high-resolution polygon mesh, each of the low-resolution polygon mesh and the high-resolution polygon mesh comprising vertices and connections that represent 3D media content. For example, mesh simplification is a standard tool in computer graphics that can generate low-resolution mesh with much fewer polygons, and an algorithm may be applied to simplify a high-resolution mesh to a low-resolution representation.

At step 704, control circuitry uses a vertex occupancy prediction network to generate, from the vertices of the low-resolution polygon mesh, approximated vertices of the high-resolution polygon mesh, wherein the vertex occupancy prediction network is trained according to a first learning algorithm. For example, during training of the vertex occupancy prediction network, the first learning algorithm may adjust weights until the vertex occupancy prediction network begins predicting output high-resolution vertex information from the low-resolution vertex information with sufficient degree of correctness. The weights adjusted by the first learning algorithm may be weights of the vertex occupancy prediction network (e.g., weights of a neural network) used to predict output high-resolution vertex information from the low-resolution vertex information. Correctness may be based on ground truth high-resolution vertex information. For example, a sufficient degree of correctness may be when the vertex occupancy prediction network outputs a predicted high-resolution vertex information that is close (e.g., within a suitable error, e.g., within 1% accuracy) to the ground truth high-resolution vertex information from an input of ground-truth low-resolution vertex information.

At step 706, control circuitry uses a connectivity prediction network to generate, from connections of the low-resolution polygon mesh, approximated connections of the high-resolution polygon mesh, wherein the connectivity prediction network is trained according to a second learning algorithm. For example, during training of the connectivity prediction network, the second learning algorithm may adjust weights until the connectivity prediction network begins predicting output high-resolution connection information from the high-resolution vertex information with sufficient degree of correctness. The weights adjusted by the second learning algorithm may be weights of the connectivity prediction network (e.g., weights of a neural network) used to predict output high-resolution connection information from the high-resolution vertex information. Correctness may be based on ground truth high-resolution connection information. For example, a sufficient degree of correctness may be when the connectivity prediction network outputs a predicted high-resolution connection information that is close (e.g., within a suitable error, e.g., within 1% accuracy) to the ground truth high-resolution connection information from an input of ground-truth high-resolution vertex information.

At step 708, control circuitry computes vertex errors between the approximated vertices and the vertices of the high-resolution polygon mesh. For example, the vertex errors may be a difference between the approximated vertex and the vertex of the high-resolution polygon mesh.

At step 710, control circuitry computes connectivity errors between the approximated connections and the connections of the high-resolution polygon mesh. For example, the connectivity errors may be a difference between the approximated connections and the connections of the high-resolution polygon mesh.

At step 712, input/output circuitry (e.g., input/output circuitry 612 of FIG. 6) connected to control circuitry transmits, to a receiver over a communication network, bitstreams of the low-resolution polygon mesh, the vertex errors, and the connectivity errors for reconstruction of the high-resolution polygon mesh and display of the 3D media content. For example, a content provider may generate the bitstreams and transmit the coded high-resolution polygon mesh to a receiver, and a user device may receive the bitstreams and decode the bitstreams to reconstruct a high-resolution polygon mesh for display of the 3D media content on the user device.

Figure 8:
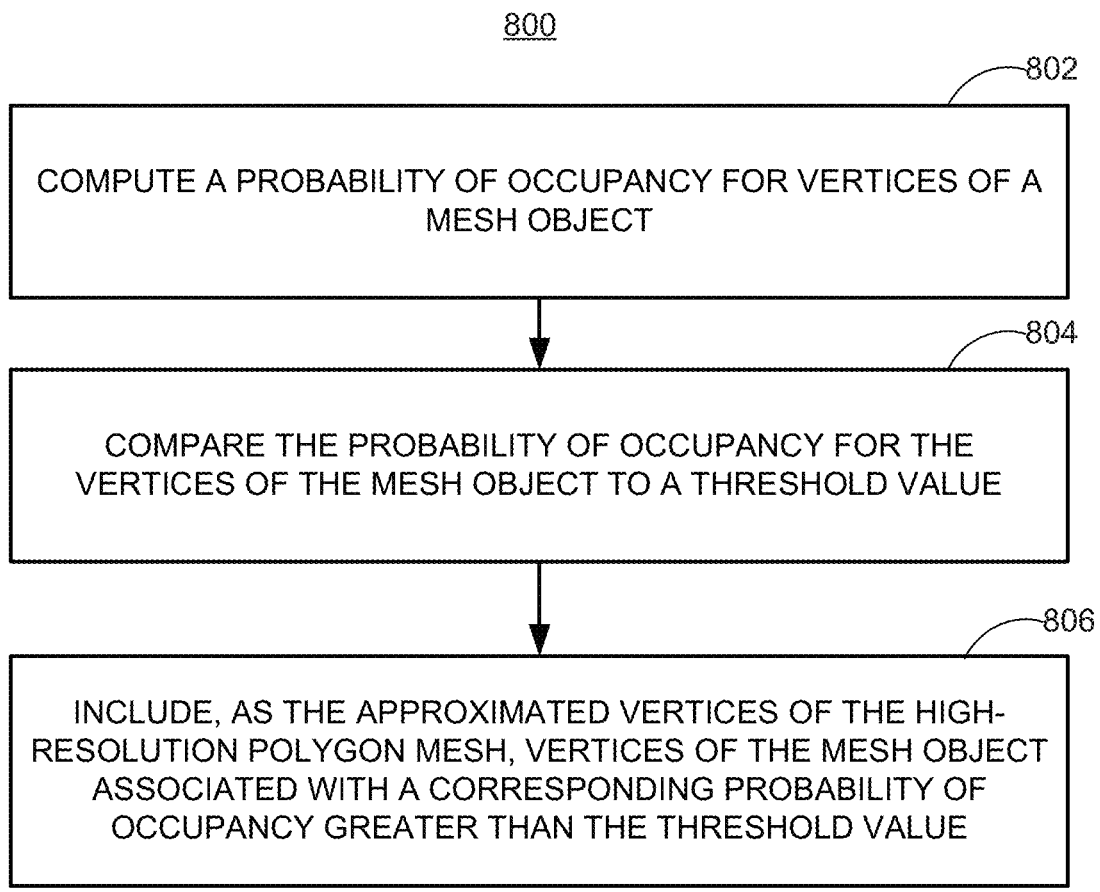
FIG. 8 is a flowchart of a detailed illustrative process for generating approximated vertices of a high-resolution polygon mesh, in accordance with some embodiments of this disclosure.

FIG. 8 is a flowchart of a detailed illustrative process for generating approximated vertices of a high-resolution polygon mesh, in accordance with some embodiments of this disclosure. In various embodiments, the individual steps of process 800 may be implemented by one or more components of the devices and systems of FIGS. 1-6. Although the present disclosure may describe certain steps of process 800 (and of other processes described herein) as being implemented by certain components of the devices and systems of FIGS. 1-6, this is for purposes of illustration only, and it should be understood that other components of the devices and systems of FIGS. 1-6 may implement those steps instead.

At step 802, control circuitry (e.g., control circuitry 611, control circuitry 618, or control circuitry of any of devices 607, 608, or 610) computes a probability of occupancy for vertices of a mesh object. For example, a mesh object may be a mesh object cube of size 10-bit, corresponding to $N=(2^{10})^3$, or 1,073,741,824 vertices. The mesh object may be a 3D structure defining all potential vertices for the high-resolution polygon mesh.

At step 804, control circuitry compares the probability of occupancy for the vertices of the mesh object to a threshold value. For example, the probability of occupancy of a vertex being greater than the threshold value indicates the occupancy of a vertex.

At step 806, control circuitry includes, as the approximated vertices of the high-resolution polygon mesh, vertices of the mesh object associated with a corresponding probability of occupancy greater than the threshold value. For example, if a probability of occupancy is greater than the threshold value, the corresponding vertex is included in the vertices of the approximated mesh.

Figure 9:
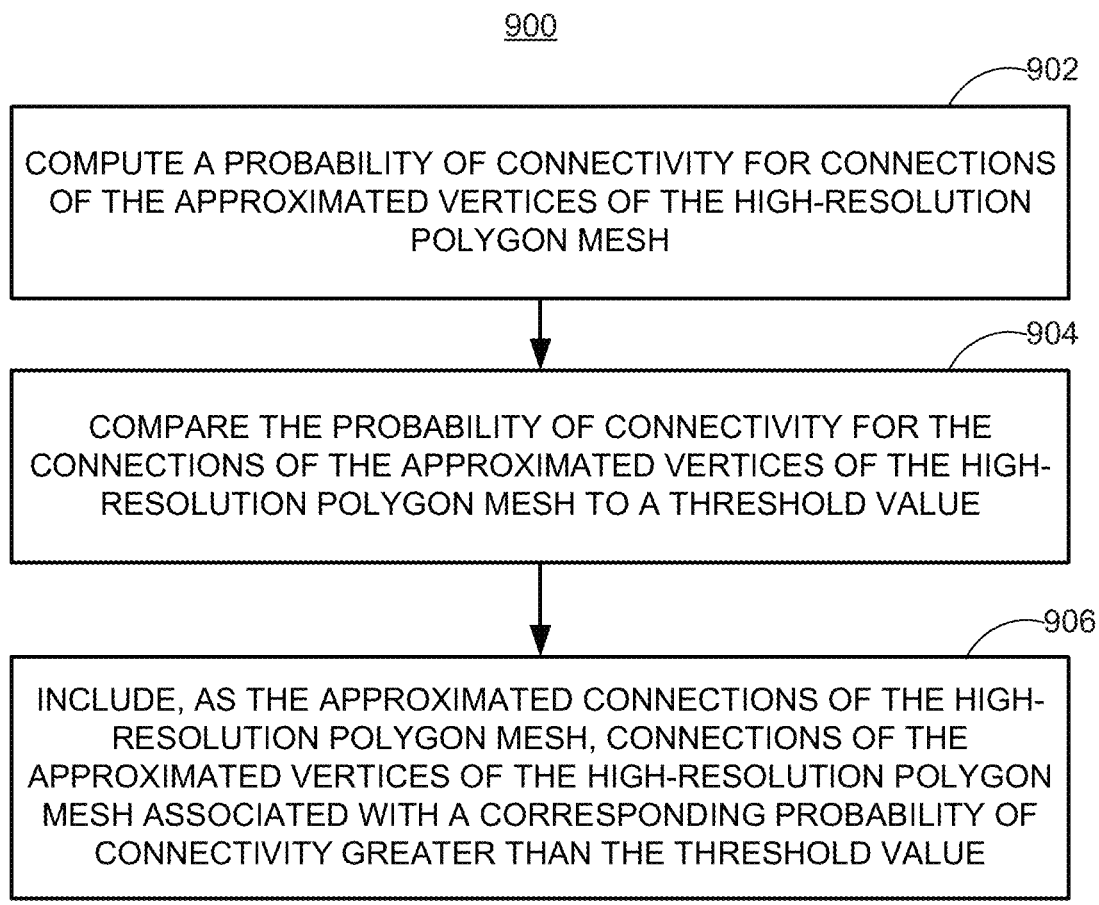
FIG. 9 is a flowchart of a detailed illustrative process for generating approximated connections of a high-resolution polygon mesh, in accordance with some embodiments of this disclosure.

FIG. 9 is a flowchart of a detailed illustrative process for generating approximated connections of a high-resolution polygon mesh, in accordance with some embodiments of this disclosure. In various embodiments, the individual steps of process 900 may be implemented by one or more components of the devices and systems of FIGS. 1-6. Although the present disclosure may describe certain steps of process 900 (and of other processes described herein) as being implemented by certain components of the devices and systems of FIGS. 1-6, this is for purposes of illustration only, and it should be understood that other components of the devices and systems of FIGS. 1-6 may implement those steps instead.

At step 902, control circuitry (e.g., control circuitry 611, control circuitry 618, or control circuitry of any of devices 607, 608, or 610) computes a probability of connectivity for connections of the approximated vertices of the high-resolution polygon mesh. For example, the probability of connectivity may be computed for K nearest neighbor candidates to each occupied vertex of the mesh object cube.

At step 904, control circuitry compares the probability of connectivity for the connections of the approximated vertices of the high-resolution polygon mesh to a threshold value. For example, the probability of connectivity of a connection (e.g., vertex of mesh object cube to a nearest neighbor vertex) being greater than the threshold value indicates the connectivity of the connection.

At step 906, control circuitry includes, as the approximated connections of the high-resolution polygon mesh, connections of the approximated vertices of the high-resolution polygon mesh associated with a corresponding probability of connectivity greater than the threshold value. For example, the probability of connectivity (of each occupied vertex of the object cube to its K nearest neighbors) is compared to a threshold value (e.g., to indicate whether the nearest neighbor vertex is a connection). If the probability of connectivity is greater than the threshold value, the connection is included in the approximated connections of a mesh.

Figure 10:
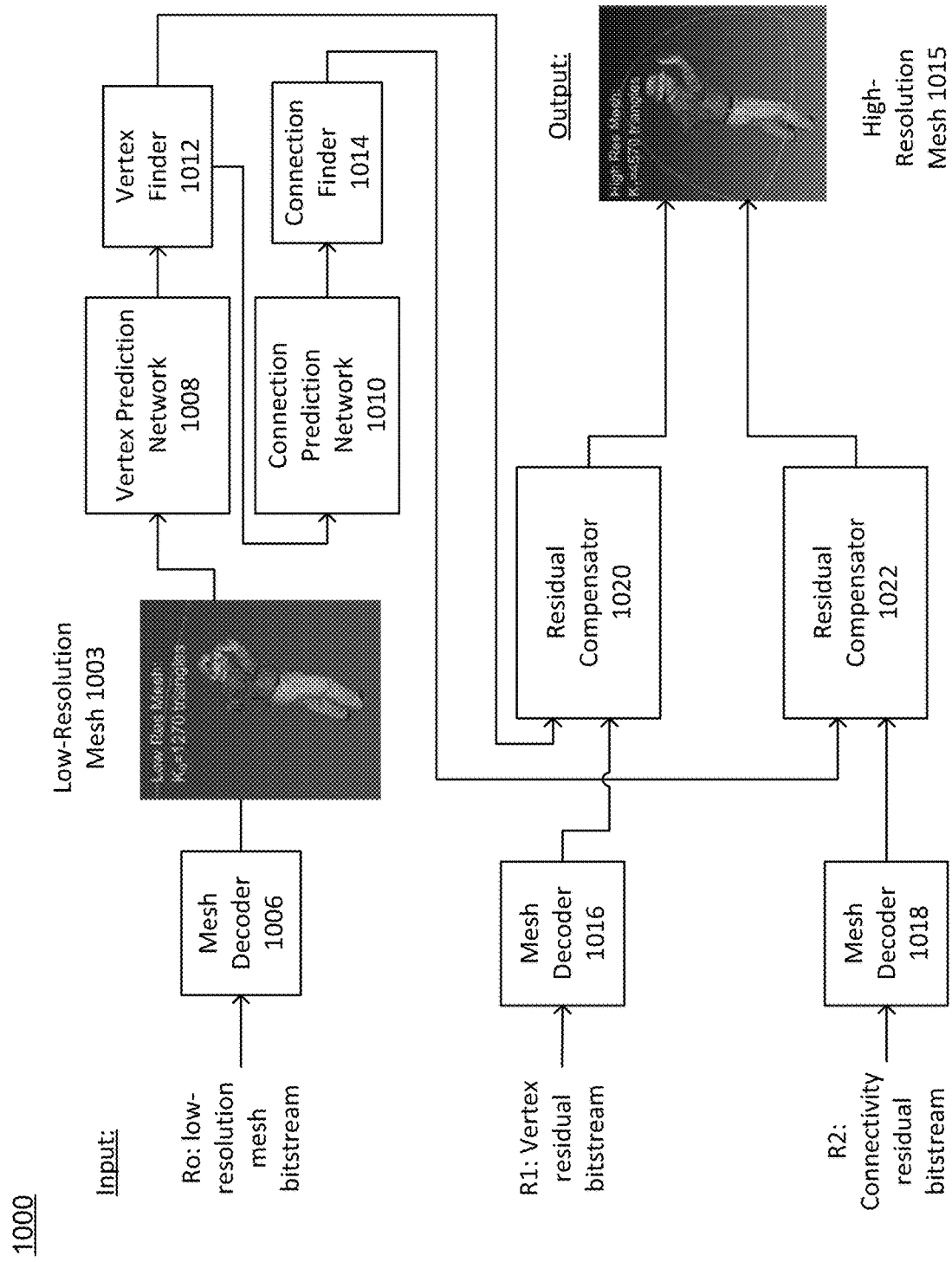
FIG. 10 shows an illustrative example of a deep learning prediction-based mesh geometry decoding system, in accordance with some embodiments of this disclosure.

FIG. 10 shows an illustrative example of a deep learning prediction-based mesh geometry decoding system 1000, in accordance with some embodiments of this disclosure. The decoding system 1000 receives as inputs, low-resolution mesh bitstream $R_0$, vertex residual bitstream $R_1$, and connectivity residual bitstream $R_2$. The decoding system 1000 predicts a high-resolution mesh from the low-resolution mesh input using a prediction network, and compensates the prediction using mesh representations of the residual bitstreams. The decoding system 1000 includes a mesh decoder 1006, vertex prediction network 1008, connection prediction network 1010, vertex finder 1012, connection finder 1014, that correspond to (e.g., are the same as) a mesh decoder 106, vertex prediction network 108, connection prediction network 110, vertex finder 112, connection finder 114 of FIG. 1, respectively. The decoding system 1000 also includes a mesh decoder 1016, a mesh decoder 1018, a residual compensator 1020, and a residual compensator 1022.

The mesh decoder 1006 may generate a low-resolution mesh 1003 from the low-resolution mesh bitstream $R_0$. The low-resolution mesh 1003 of FIG. 10 may correspond to (e.g., is the same as) low-resolution mesh 103 of FIG. 1. The vertex prediction network 1008 (e.g., vertex occupancy prediction network) may predict a probability of occupancy of each vertex in a mesh object cube. The vertex finder 1012 may determine the vertices included in approximated vertices of a high-resolution mesh (e.g., the occupied vertices in the mesh object cube). The connection prediction network 1010 (e.g., connectivity prediction network) may predict a probability of connectivity of the approximated vertices of the high resolution mesh (e.g., each occupied vertex in the mesh object cube) to its nearest neighbors. In some embodiments, the input to the connection prediction network 1010 may be reconstructed vertices of a high-resolution mesh. The reconstructed vertices may be a sum of the vertex residual (e.g., vertex error) and the approximated vertices of the high-resolution mesh (e.g., correcting for vertex errors). The connection finder 1014 may determine the connections included in approximated connections of the high-resolution mesh.

The mesh decoder 1016 decodes the vertex residual bitstream $R_1$ to generate a vertex residual of the high-resolution target mesh. The input of mesh decoder 1016 is the vertex residual bitstream $R_1$, and the output of the mesh decoder 1016 is the vertex residual. For example, mesh decoder 1016 may utilize a mesh geometry coding tool such as DRACO to decode the residual bitstream.

The mesh decoder 1018 decodes the connectivity residual bitstream $R_2$ to generate a connectivity residual of the high-resolution target mesh. The input of mesh decoder 1018 is the vertex residual bitstream $R_2$, and the output of the mesh decoder 1016 is the connectivity residual. For example, mesh decoder 1018 may utilize a mesh geometry coding tool such as DRACO to decode the residual bitstream.

The residual compensator 1020 compensates for the difference between the approximated vertices of the target high-resolution mesh and the vertices of the target high-resolution mesh. The inputs of residual compensator 1020 are the approximated vertices of the target high-resolution mesh and the vertex errors of the target high-resolution mesh. For example, to compensate for the difference, the residual compensator 1020 may add the vertex error to the approximated vertices of the high-resolution mesh. For example, the vertex residual may be an occupancy matrix N×1 representing vertices of the target mesh minus the occupancy matrix N×1 representing the approximated vertices of the target mesh. For example, a vertex may be approximated to be occupied when it was not occupied in the vertices of the target high-resolution mesh. In this case, a corresponding element in the occupancy matrix of the vertices of the target high-resolution mesh would be "0" indicating no vertex, but in the occupancy matrix of the approximated vertices the element would have an entry of "1", the difference being "0-1=-1" for that element in the vertex error. To compensate, the residual compensator 1020 may add the vertex error (e.g., element having an error of "-1"), to the approximated vertices of the high-resolution mesh (e.g., element having a value of "1"), to result in a "0" for that element in the occupancy matrix, correcting for the error (e.g., indicating the corresponding vertex is not occupied in the target mesh).

The residual compensator 1022 compensates for the difference between the approximated connections of the target high-resolution mesh to the connections of the target high-resolution mesh. The inputs of residual compensator 1022 are the approximated connections of the target high-resolution mesh and the connectivity errors of the target high-resolution mesh. For example, to compensate for the difference, the residual compensator 1022 may add the connectivity error to the approximated connections of the high-resolution mesh. For example, the connectivity residual may be represented as connectivity matrix of size N'×K representing connections of the target high-resolution mesh minus the connectivity matrix N'×K representing the approximated connections of the target high-resolution mesh. As an example, a connection of a vertex (e.g., one of the N' vertices of the target mesh) to another vertex (e.g., one of its K nearest neighbor candidates) may be approximated as a connection when it was actually not connected in the target high-resolution mesh. In this case, a corresponding element in the connectivity matrix representing the connections of the target high-resolution mesh would be "0" indicating no connection, but in the connectivity matrix representing the approximated connections of the high-resolution mesh would have an entry of "1", the difference being "0-1=−1" for that entry in the connectivity error. To compensate, the residual compensator 1022 may add the connectivity error (e.g., element having error of "−1"), to the approximated connectivity of the high-resolution mesh (e.g., element having error of "1"), to result in a "0" for that element in the connectivity matrix, correcting for the error (e.g., indicating the target mesh does not have a connection between the corresponding vertices). The output of the residual compensator 1020 and the residual compensator 1022 may be the reconstructed vertices and reconstructed connections, respectively, of the high-resolution mesh 1015 of FIG. 10, which corresponds to (e.g., is the same as) the high-resolution mesh 101 of FIG. 1.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
generating a low-resolution polygon mesh from a high-resolution polygon mesh, each of the low-resolution polygon mesh and the high-resolution polygon mesh comprising vertices and connections that represent 3D media content;
using a vertex occupancy prediction network to generate, from the vertices of the low-resolution polygon mesh, reconstructed vertices of the high-resolution polygon mesh, wherein the vertex occupancy prediction network is trained according to a first learning algorithm;
using a connectivity prediction network to generate, from the reconstructed vertices of the high-resolution polygon mesh, reconstructed connections of the high-resolution polygon mesh, wherein the connectivity prediction network is trained according to a second learning algorithm;
computing vertex errors between the reconstructed vertices and the vertices of the high-resolution polygon mesh;
computing connectivity errors between the reconstructed connections and the connections of the high-resolution polygon mesh; and
transmitting, to a receiver over a communication network, bitstreams of the low-resolution polygon mesh, the vertex errors, and the connectivity errors for reconstruction of the high-resolution polygon mesh and display of the 3D media content.

2. The method of claim 1, wherein the using the vertex occupancy prediction network to generate the reconstructed vertices comprises:
computing a probability of occupancy for vertices of a mesh object, wherein the mesh object is a 3D structure defining all potential vertices for the high-resolution polygon mesh;
comparing the probability of occupancy for the vertices of the mesh object to a threshold value; and
including, as the reconstructed vertices of the high-resolution polygon mesh, vertices of the mesh object associated with a corresponding probability of occupancy greater than the threshold value.

3. The method of claim 2, wherein the using the vertex occupancy prediction network to generate the reconstructed vertices further comprises:
using a 3D sparse convolutional neural network to generate initial feature channels.

4. The method of claim 3, wherein the using the vertex occupancy prediction network to generate the reconstructed vertices further comprises:
using a first plurality of groups of parallel convolution layers and a downscaling convolution layer to produce, from the initial feature channels, expanded feature channels.

5. The method of claim 4, wherein the using the vertex occupancy prediction network to generate the reconstructed vertices further comprises:
using a second plurality of groups of a upscaling convolution layer and the parallel convolution layers to produce, from the expanded feature channels, output feature channels.

6. The method of claim 5, wherein the using the vertex occupancy prediction network to generate the reconstructed vertices further comprises:
using the 3D sparse convolutional neural network to generate, from the output feature channels, a final output feature.

7. The method of claim 6, wherein the using the vertex occupancy prediction network to generate the reconstructed vertices further comprises:
using a binary cross entropy SoftMax layer to output, from the final output feature, the probability of occupancy for the vertices of the mesh object.

8. The method of claim 1, wherein the using the connectivity prediction network to generate the reconstructed connections comprises:
computing a probability of connectivity for connections of the reconstructed vertices of the high-resolution polygon mesh;
comparing the probability of connectivity for the connections of the reconstructed vertices of the high-resolution polygon mesh to a threshold value; and
including, as the reconstructed connections of the high-resolution polygon mesh, connections of the reconstructed vertices of the high-resolution polygon mesh associated with a corresponding probability of connectivity greater than the threshold value.

9. The method of claim 8, wherein the using the connectivity prediction network to generate the reconstructed connections further comprises:
- using a 3D sparse convolutional neural network to generate initial feature channels;
- using a first plurality of groups of parallel convolution layers and a downscaling convolution layer to produce, from the initial feature channels, expanded feature channels;
- using a second plurality of groups of an upscaling convolution layer and the parallel convolution layers to produce, from the expanded feature channels, output feature channels; and
- using the 3D sparse convolutional neural network to generate an intermediate output feature from the output feature channels.

10. The method of claim 9, wherein the using the connectivity prediction network to generate the reconstructed connections further comprises:
- using a transformer block to generate, from the intermediate output feature, a final output feature; and
- using a binary cross entropy SoftMax layer to output the probability of connectivity for connections of the reconstructed vertices of the high-resolution polygon mesh.

11. A system comprising:
control circuitry configured to:
- generate a low-resolution polygon mesh from a high-resolution polygon mesh, each of the low-resolution polygon mesh and the high-resolution polygon mesh comprising vertices and connections that represent 3D media content;
- use a vertex occupancy prediction network to generate, from the vertices of the low-resolution polygon mesh, reconstructed vertices of the high-resolution polygon mesh, wherein the vertex occupancy prediction network is trained according to a first learning algorithm;
- use a connectivity prediction network to generate, from the reconstructed vertices of the high-resolution polygon mesh, reconstructed connections of the high-resolution polygon mesh, wherein the connectivity prediction network is trained according to a second learning algorithm;
- compute vertex errors between the reconstructed vertices and the vertices of the high-resolution polygon mesh; and
- compute connectivity errors between the reconstructed connections and the connections of the high-resolution polygon mesh; and input/output circuitry configured to:
- transmit, to a receiver over a communication network, bitstreams of the low-resolution polygon mesh, the vertex errors, and the connectivity errors for reconstruction of the high-resolution polygon mesh and display of the 3D media content.

12. The system of claim 11, wherein the control circuitry is configured to generate the reconstructed vertices by:
- computing a probability of occupancy for vertices of a mesh object, wherein the mesh object is a 3D structure defining all potential vertices for the high-resolution polygon mesh;
- comparing the probability of occupancy for the vertices of the mesh object to a threshold value; and
- including, as the reconstructed vertices of the high-resolution polygon mesh, vertices of the mesh object associated with a corresponding probability of occupancy greater than the threshold value.

13. The system of claim 12, wherein the control circuitry is further configured to generate the reconstructed vertices by:
- using a 3D sparse convolutional neural network to generate initial feature channels.

14. The system of claim 13, wherein the control circuitry is further configured to generate the reconstructed vertices by:
- using a first plurality of groups of parallel convolution layers and a downscaling convolution layer to produce, from the initial feature channels, expanded feature channels.

15. The system of claim 14, wherein the control circuitry is further configured to generate the reconstructed vertices by:
- using a second plurality of groups of an upscaling convolution layer and the parallel convolution layers to produce, from the expanded feature channels, output feature channels.

16. The system of claim 15, wherein the control circuitry is further configured to generate the reconstructed vertices by:
- using the 3D sparse convolutional neural network to generate, from the output feature channels, a final output feature.

17. The system of claim 16, wherein the control circuitry is further configured to generate the reconstructed vertices by:
- using a binary cross entropy SoftMax layer to output, from the final output feature, the probability of occupancy for the vertices of the mesh object.

18. The system of claim 11, wherein the control circuitry is configured to generate the reconstructed connections by:
- computing a probability of connectivity for connections of the reconstructed vertices of the high-resolution polygon mesh;
- comparing the probability of connectivity for the connections of the reconstructed vertices of the high-resolution polygon mesh to a threshold value; and
- including, as the reconstructed connections of the high-resolution polygon mesh, connections of the reconstructed vertices of the high-resolution polygon mesh associated with a corresponding probability of connectivity greater than the threshold value.

19. The system of claim 18, wherein the control circuitry is further configured to generate the reconstructed connections by:
- using a 3D sparse convolutional neural network to generate initial feature channels;
- using a first plurality of groups of parallel convolution layers and a downscaling convolution layer to produce, from the initial feature channels, expanded feature channels;
- using a second plurality of groups of an upscaling convolution layer and the parallel convolution layers to produce, from the expanded feature channels, output feature channels; and
- using the 3D sparse convolutional neural network to generate, from the output feature channels, an intermediate output.

20. The system of claim 19, wherein the control circuitry is further configured to generate the reconstructed connections by:
- using a transformer block to generate a final output feature from the intermediate output feature; and using a binary cross entropy SoftMax layer to output the probability of connectivity for the connections of the reconstructed vertices of the high-resolution polygon mesh.

* * * * *